(12) United States Patent
Hasegawa et al.

(10) Patent No.: US 10,163,272 B2
(45) Date of Patent: Dec. 25, 2018

(54) VEHICULAR ELECTRONIC CONTROL UNIT AND VEHICULAR SERVICE MANAGEMENT SYSTEM

(71) Applicant: DENSO CORPORATION, Kariya, Aichi-pref. (JP)

(72) Inventors: Takuya Hasegawa, Kariya (JP); Kazuaki Hayakawa, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/609,065

(22) Filed: May 31, 2017

(65) Prior Publication Data
US 2017/0352198 A1 Dec. 7, 2017

(30) Foreign Application Priority Data

Jun. 2, 2016 (JP) ................................ 2016-110912
Apr. 7, 2017 (JP) ................................ 2017-076748

(51) Int. Cl.

| | |
|---|---|
| *G01M 17/00* | (2006.01) |
| *G06F 7/00* | (2006.01) |
| *G06F 11/30* | (2006.01) |
| *G06F 19/00* | (2018.01) |
| *G07C 5/00* | (2006.01) |
| *G07C 5/08* | (2006.01) |
| *G06F 9/50* | (2006.01) |

(Continued)

(52) U.S. Cl.
CPC ............... *G07C 5/006* (2013.01); *G06F 9/50* (2013.01); *G06F 9/546* (2013.01); *G07C 5/008* (2013.01); *G07C 5/0808* (2013.01); *B60R 22/00* (2013.01); *B60R 25/10* (2013.01); *B60W 2050/0001* (2013.01); *H04L 67/12* (2013.01)

(58) Field of Classification Search
CPC ...... G07C 5/006; G07C 5/008; G07C 5/0808; B60R 22/00; B60R 25/10; H04Q 7/24
USPC ............... 701/29.4, 48; 340/426.24; 370/338
See application file for complete search history.

(56) References Cited

U.S. PATENT DOCUMENTS

| | | | |
|---|---|---|---|
| 6,526,460 B1 | 2/2003 | Dauner et al. | |
| 2004/0117494 A1* | 6/2004 | Mitchell | ................. H04L 67/36 709/230 |

(Continued)

FOREIGN PATENT DOCUMENTS

| | | |
|---|---|---|
| JP | 2000-165422 A | 6/2000 |
| JP | 2006-142994 A | 6/2006 |
| JP | 2008074124 A | 4/2008 |

*Primary Examiner* — Mahmoud S Ismail
(74) *Attorney, Agent, or Firm* — Harness, Dickey & Pierce, P.L.C.

(57) ABSTRACT

A vehicular ECU (electronic control unit) is any one of a plurality of vehicular ECUs connected to an in-vehicle network in a vehicle and includes: a service interface, a service bus, and a service manager. The service interface issues a request of service that uses a function installed in a different vehicular ECU based on a request from the application, and makes the application generate a service as a response to a request of service from the different vehicular ECU. The service bus transmits and receives a message corresponding to a request of service and a response by using a predetermined protocol between the service interfaces of the vehicular ECU and the different vehicular ECU. The service manager achieves the service to be dynamically and interoperably used by managing a position of the service.

11 Claims, 16 Drawing Sheets

(51) Int. Cl.
*G06F 9/54* (2006.01)
*B60R 25/10* (2013.01)
*H04W 4/00* (2018.01)
*B60R 22/00* (2006.01)
*E05F 15/00* (2015.01)
*G05D 1/00* (2006.01)
*G05D 3/00* (2006.01)
*G06F 17/00* (2006.01)
*B60W 50/00* (2006.01)
*H04L 29/08* (2006.01)

(56) References Cited

U.S. PATENT DOCUMENTS

| | | | | |
|---|---|---|---|---|
| 2005/0243779 | A1* | 11/2005 | Bolz | G07C 5/008 370/338 |
| 2006/0111825 | A1* | 5/2006 | Okada | B60W 50/0205 701/48 |
| 2008/0068144 | A1* | 3/2008 | Sato | B60R 25/24 340/426.24 |

* cited by examiner

FIG. 5A

| ITEMS | | SIZE(BIT) | DETAILS |
|---|---|---|---|
| COMMON INFO FOR ALL SERVICES | | | |
| | SERVICE ID | 32 | (1) |
| | SERVICE VERSION | 16 | (2) |
| | ROLE | 16 | (3) |
| | HEARTBEAT INTERVAL | 8 | (4) |
| | LOCAL SERVICE BUS ID | 16 | (5) |
| | RESERVE (PADDING) | 6 | − |
| | SERVICE STATE | 2 | (6) |

FIG. 5B

| ITEMS | | | | SIZE(BIT) | DETAILS |
|---|---|---|---|---|---|
| SERVICE I/F | | | | | |
| | NUMBER OF PROVIDED SERVICE I/F (1) | | | 16 | (7) |
| | PROVIDED SERVICE I/F (1) | | | | |
| | | SERVICE I/F ID | | 16 | (8) |
| | | PROVISION METHOD | | 1 | (9) |
| | | RESERVE (PADDING) | | 7 | - |
| | | AVAILABLE ROLE | | 16 | (3) |
| | | NUMBER OF Subscribe (m) | | 16 | (10) |
| | | Subscribe SERVICE INFO (1) | | | |
| | | | SERVICE ID | 32 | (1) |
| | | | SERVICE VERSION | 16 | (2) |
| | | | LOCAL SERVICE BUS ID | 16 | (5) |
| | | : | | | |
| | | Subscribe SERVICE INFO (m) | | | |
| | : | | | | |
| | PROVIDED SERVICE I/F(1) | | | | |
| | NUMBER OF USED SERVICES(n) | | | 8 | (11) |
| | USED SERVICE INFO (1) | | | | |
| | | SERVICE ID | | 32 | (1) |
| | | SERVICE VERSION | | 16 | (2) |
| | | RESERVE (PADDING) | | 2 | - |
| | | USED SERVICE VERSION ASSIGNMENT | | 6 | (12) |
| | | : | | | |
| | USED SERVICE INFO (n) | | | | |

FIG. 6

| ITEMS | DETAILS |
|---|---|
| ALTERNATIVE SERVICE | (1) |
| EFFECT ON VEHICLE CONTROL | (2) |
| PRIORITY TO TRANSMIT OR RECEIVE A SERVICE | (3) |
| AUTHORITY AS AN ACTIVE OR PASSIVE ENTITY | (4) |
| PLACE TO INSTALL A SERVICE | (5) |
| RELIABILITY | (6) |
| SERVICE OF OTHER VEHICLES PERMITTED TO BE LINKED | (7) |
| EXTERIOR SERVICE PERMITTED TO BE LINKED | (8) |
| PRICE | (9) |
| RECOMMENDATION | (10) |
| DELAY REQUIREMENT | (11) |
| EXPIRATION DATE | (12) |
| ADDITION OR REMOVAL UNIT | (13) |
| SECURITY LEVEL | (14) |
| SAFETY LEVEL | (15) |

VEHICULAR ELECTRONIC CONTROL UNIT AND VEHICULAR SERVICE MANAGEMENT SYSTEM

CROSS REFERENCE TO RELATED APPLICATION

The present application is based on Japanese Patent Applications No. 2016410912 filed on Jun. 2, 2016 and No. 2017-76748 filed on Apr. 7, 2017, the disclosures of which are incorporated herein by reference.

TECHNICAL FIELD

The present disclosure relates to a vehicular electronic control unit and a vehicular service management system.

BACKGROUND ART

Patent Literature 1: JP 2000465422 A

Recently, a vehicle includes vehicular electronic control units that control respective vehicular instruments; the vehicular electronic control units are connected via an in-vehicle network to operate cooperatively. Moreover, there are recently developed a vehicular electronic control unit coordinating with an exterior system outside the vehicle by communicating or connecting to the exterior system outside the vehicle (such as: a server to provide traffic information, entertainment information, or mail service; or an in-home system) via wireless communication.

There is conventional proposed a vehicle information platform coordinating such an exterior system using the same platform to operate applications and thereby ensuring application reusability in configuring a new system or interoperability between applications (see Patent Literature 1).

SUMMARY

A vehicle includes coexisting electronic control units installed with different applications such as: an engine control application that periodically collects data, always outputs a result, and requires high reliability; a body control application that performs a set of sequences corresponding to user manipulation as an event; and a navigation application that uses large-scale data and requires less reliability.

There is, however, no mechanism that dynamically and interoperably uses functions of several electronic control units networked in the vehicle, degrading flexibility. This requires an application developer to consider the existence of a layer lower than the topmost application layer, involving a limiting factor against the development of an application.

It is an object of the present disclosure to provide a vehicular electronic control unit and a vehicular service management system capable of dynamically and interoperably using functions.

According to an example of the present disclosure, a vehicular ECU (electronic control unit) is provided to be any one of a plurality of vehicular ECUs connected to an in-vehicle network in a vehicle. The vehicular ECU performs a predetermined function by using an application that is installed. The vehicular ECU coordinates with a different vehicular ECU among the plurality of vehicular ECUs excluding the vehicular ECU. The vehicular ECU includes a service interface, a service bus, and a service manager. The service interface issues a request of service that uses a function installed in the different vehicular ECU based on a request from the application, and makes the application generate a service as a response to a request of service from the different vehicular ECU. The service bus transmits and receives a message correspondingly to a request of service and a response by using a predetermined protocol between the service interface of the vehicular ECU and the service interface of the different vehicular ECU. The service manager achieves the service to be used dynamically and interoperably by managing a position of the service.

According to another example of the present disclosure, a vehicular service management system is provided to include (i) a plurality of vehicular ECUs (electronic control units) that are connected to an in-vehicle network in a vehicle, each of the vehicular ECUs performing a predetermined function by using an application; and (ii) a gateway that is connected to the in-vehicle network and routes information between the vehicular ECUs. A subject vehicular ECU being any one of the vehicular ECUs cooperates with a different vehicular ECU among the vehicular ECUs excluding the subject vehicular ECU. The subject vehicular ECU includes: a service interface and a service bus. The service interface issues a request of service that uses a function installed in the different vehicular ECU based on a request from the application, and makes the application generate a service as a response to a request of service from the different vehicular ECU. The service bus transmits and receives a message correspondingly to a request of service and a response by using a predetermined protocol between the service interface of the subject vehicular ECU and the service interface of the different vehicular ECU. The gateway includes a service manager that achieves the service to be dynamically and interoperably used by managing a position of the service.

Note that the word of "dynamic" signifies being executable under an operating state of the system without need of re-starting.

BRIEF DESCRIPTION OF DRAWINGS

The above and other objects, features and advantages of the present disclosure will become more apparent from the following detailed description made with reference to the accompanying drawings. In the drawings:

FIGS. 5A and 5B are diagrams illustrating items of information on service;

FIG. 6 is a diagram illustrating other items of information on service;

DETAILED DESCRIPTION

Embodiment

An embodiment of the present disclosure will be described with reference to the accompanying drawings.

<Configuration>

Figure 2:
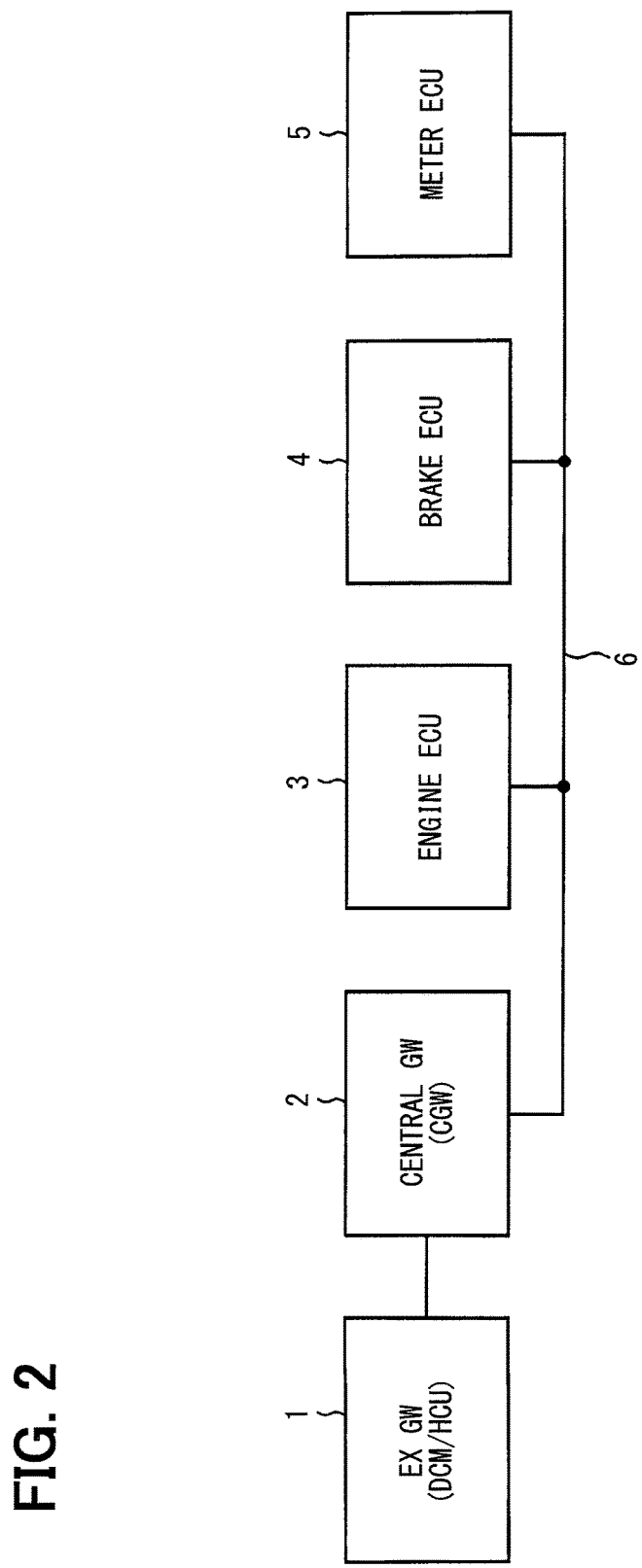
FIG. 2 is a block diagram illustrating a vehicular service management system.

As in FIG. 2, a vehicular service management system includes vehicular electronic control units (ECUs) that are connected via an in-vehicle network 6. The vehicular ECUs include: an extended gateway 1 ((DCM (Data Communication Module)/HCU (HMI (Human Machine Interface) Control Unit)), referred to as an extended GW); a central gateway 2 (CGW, also referred to as a basic GW or a gateway); an engine ECU 3; a brake ECU 4; and a meter ECU 5. The in-vehicle network 6 uses protocols such as CAN (registered trademark, Controller Area Network), LIN (registered trademark, Local Interconnect Network), FlexRay (registered trademark), or Ethernet (registered trademark). Each domain uses an appropriate protocol. FIG. 2 illustrates representative ECUs. In fact, the in-vehicle network 6 connects with approximately 100 ECUs.

The extended GW 1 is installed with a vehicle exterior communication service that enables the use of services external to the vehicle (i.e., vehicle exterior services) via wireless communication or cable connection. The vehicle exterior services are provided by exterior systems (such as: a server to provide traffic information, entertainment information, or mail service; and an in-home system).

The central GW 2 has a function to route (relay) between domains to which the ECUs 3 through 5 belong. The domains are related to (i) vehicle exterior services, (ii) human being, (iii) environment, (iv) body, and (v) motion. The central GW 2 includes an unshown management table that manages dynamic addition and removal of services to be described later. It is noted that the word of "dynamic" signifies being executable under an operating state of the system without need of re-starting.

The GWs 1 and 2, and the ECUs 3 through 5 each include a publicly known controller. The controller is configured as a microcomputer including a CPU, ROM, RAM, and I/O. The controller executes a function that is provided as being stored in a non-transitory tangible storage medium, performing a process corresponding to the function.

The ECUs 3 through 5 are each installed with a function as software to provide a service that enables various functions performed by the ECUs 3 through 5 to be used by other ECUs. This service enables an application to supply request information in the form of a predetermined format for the request information when the application needs to request another service to perform an intended function. The other service is supplied with the request information as a message to perform the intended function.

Figure 1:
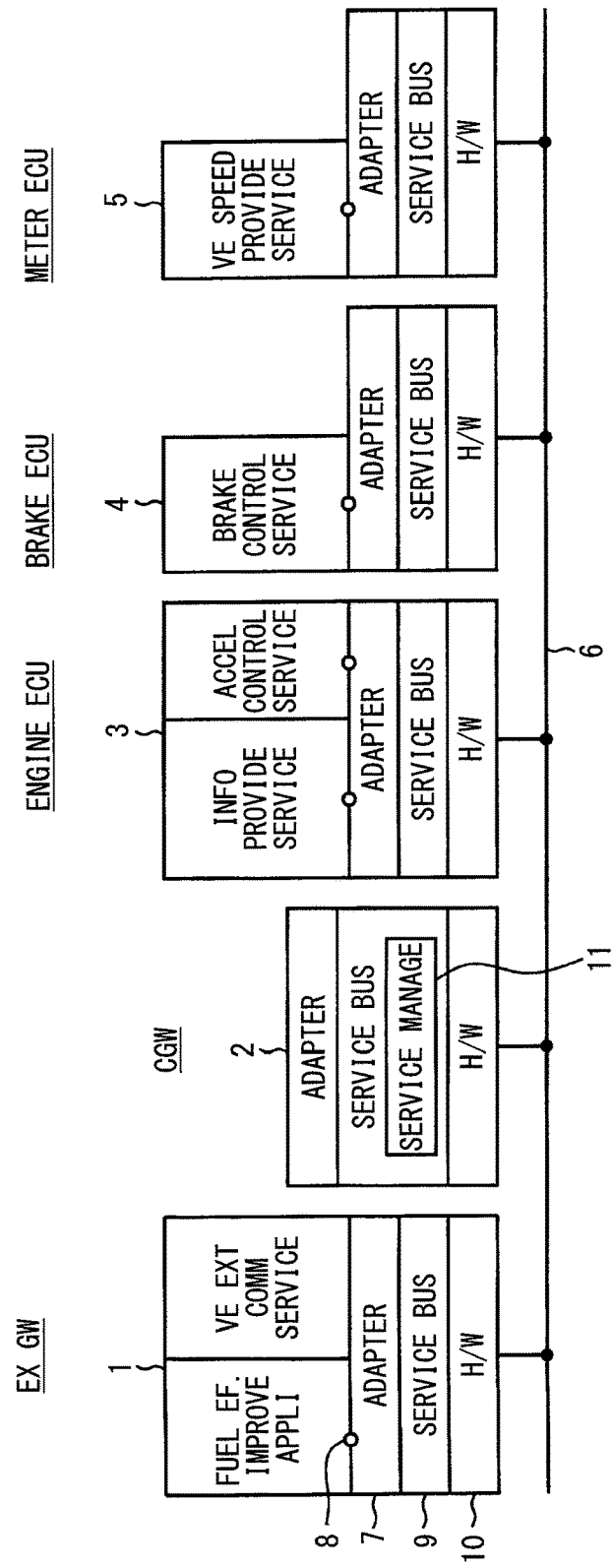
FIG. 1 is a functional block diagram of each ECU according to an embodiment.

As in FIG. 1, the extended GW 1 is installed with (i) a fuel efficiency improvement application and (ii) a vehicle exterior communication service, according to the embodiment. The engine ECU 3 is installed with an information provision service and an accelerator control service, which are used by the fuel efficiency improvement application to improve the fuel efficiency. The information provision service includes a fuel consumption provision service, an engine temperature provision service, an engine coolant temperature provision service, and an engine oil temperature provision service. The accelerator control service supplementarily controls the accelerator control manipulated by the user. Similarly, the brake ECU 4 is installed with a brake control service. The brake control service supplementarily controls the brake control manipulated by the user. The meter ECU 5 is installed with a vehicle speed provision service.

In contrast, the vehicle exterior service is a function for coordinating the vehicle interior/exterior services or applications to be mutually or interoperably used. That is, the vehicle exterior communication method can adopt various methods each including a physical layer and a protocol. The vehicle exterior communication method is installed on the service bus as one service, instead of being installed as a function of the service bus.

<Functions Providing Services>

The description below explains functions that provide services according to the embodiment. Functions of various in-vehicle instruments in a vehicle are prescribed as services. A usage method is prescribed for each of the services on the vehicle information platform. An application thereby follows the usage method when the application uses a service provided by another application.

The ECUs 3 through 5, an exterior cloud, and an instrument such as a smartphone or mobile instrument cannot directly and interoperably use respective functions and cannot add and remove services. As in FIG. 3, there are provided a service interface 8 (hereinafter referred to as a service I/F) supplied by an adapter 7 and a service bus 9 to transmit and receive messages corresponding to service request and response based on a predetermined protocol to enable the interoperable use and the addition and removal of services. The service bus 9 is connected to the in-vehicle network 6 via a hardware (H/W) 10.

A service bus 9 has a function as a service manager 11 (also referred to as a service management section) that manages positions and addition and removal of services. According to the embodiment, as in FIG. 1, the central GW 2 includes the service manager 11. Namely, the central GW 2 has (i) the function to route information between domains based on a routing table and (ii) the function to manage positions and addition and removal of services.

Suppose the case where a transmission ECU and a reception ECU are connected to mutually different buses that are interconnected by a gateway. In this case, the function to route is to register a message ID necessary for the reception ECU into the routing table of the gateway. That is, the routing table is a table (combinations of bus IDs and message IDs) describing a rule for routing the message to the bus of the transmission ECU. The message ID in the in-vehicle network typically refers to a CAN-ID.

Figure 3:
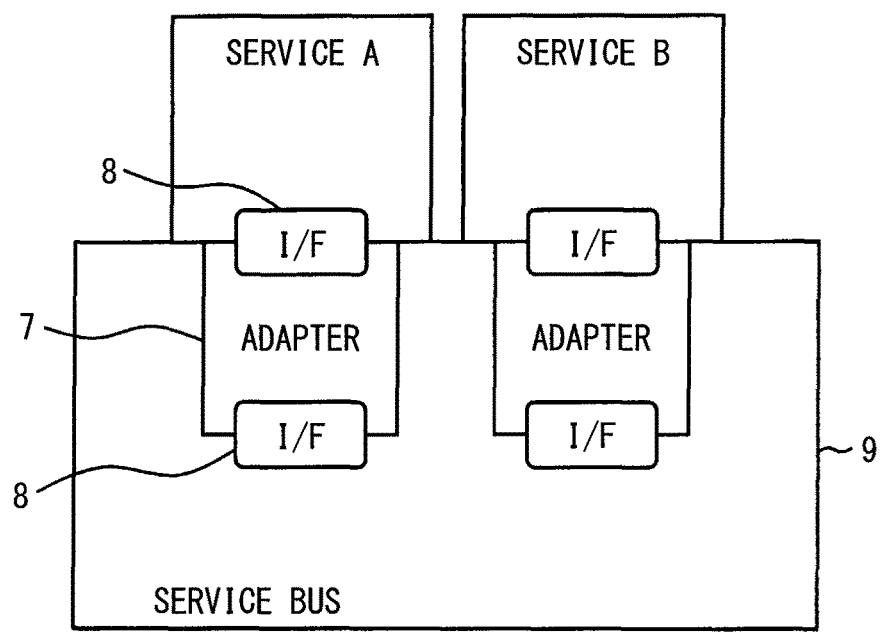
FIG. 3 is a diagram illustrating relation between a service I/F and a service bus provided by an adapter.

As in FIG. 3, one service uses another service via the service I/F 8. An application developer need not be aware of the existence of a layer lower than the topmost application layer due to the mediating service I/F 8. Since the service manager 11 manages positions and addition and removal of services, the application developer need not be aware of position and addition and removal of a service to be used.

The service I/F 8 is supplied by the adapter 7 and enables a vehicle interior/exterior service or application to use, as services, existing functions such as the ECUs 3 through 5, an exterior cloud, and a smartphone. A process uses the service I/F 8 to enable a service or an application to use the function as a service. This process is referred to as "function-to-service transformation." In addition, an application which coordinates a plurality of services is referred to as an integrated application.

Figure 4:
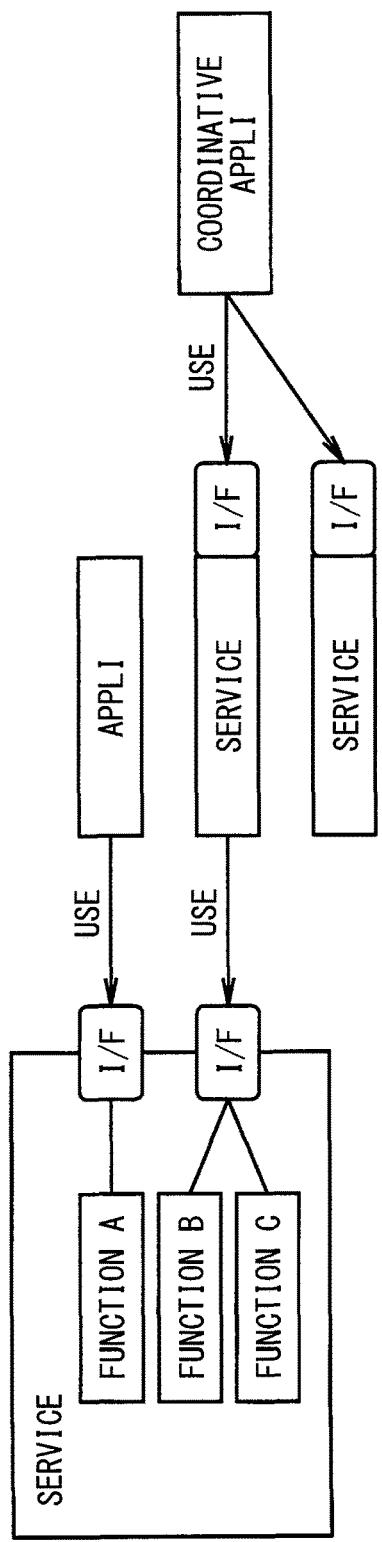
FIG. 4 is a diagram illustrating relation between an application function and a service.

As in FIG. 4, a service can interoperably use other services by exchanging messages via the service I/F 8. Without need to limit to that the services use each other, an application can use services and an integrated application can also use services.

<Protocols for Communication Between Services>

Protocols for communication between services are available as a Request/Response type and a Publish/Subscribe type. The Request/Response type performs one-to-one message, i.e., exchanges messages of request and response. The Publish/Subscribe type performs one-to-many message, i.e., publishes a message to many and unspecified registered subscribers.

(Request/Response Type)

Services exchange messages on a one-to-one basis. A response is returned in response to a request.

(Publish/Subscribe Type)

Services exchange messages on a one-to-many basis. No response is returned in response to Publish. Publish, if any, is notified to many and unspecified services registered to Subscribe.

<Service Specifications>

The service specifications (i.e., items of information on service), which are illustrated in FIGS. 5A and 5B, may be adopted as types of information (attributes). Further, to be explained later, other service specifications, which are illustrated in FIG. 6, may be also adopted. FIGS. 5A and 5B illustrate service specifications with the sizes (bits) and details or meanings (1) to (12) as follows, (1) Service ID This indicates an identifier (0-4294967295) for uniquely identify the service.

(2) Service version

This indicates a version of the service.

Formal: [I/F version (8 bits)]. [inner version (8 bits)]

I/F version—to be incremented at the time of performing a correction which influences on users.

When I/F is added

When I/F is deleted

When there is no compatibility of I/F before or after version upgrade

Inner version—to be incremented at the time of performing a correction which does not influence on users and to return when I/F version is changed.

(3) Role

This indicates a role assigned to the service.

Setting the corresponding bit to 1.

bit 0—OEM, bit 1—supplier, bit 2—third party, bit 3-15—reserve (4) Heartbeat Interval This indicates a transmission interval (1 to 65535 seconds) of a heartbeat for detecting an anomaly in the service.

Being specified in seconds. When "0" is specified, no heartbeat is transmitted, (5) Local Service Bus ID This indicates an identifier (0-65535) for uniquely specifying a local service bus in which the service is installed.

(6) Service State

This indicates an operating state of the service.

0: Service start impossible, 1: Service start possible, 2: Service is started (7) Number of Provided Service I/Fs This indicates the number (0-65535) of service I/Fs which are provided by the service.

When "0", "Provided service I/F" is not held.

(8) Service I/F ID

This indicates an ID (0-65535) of service I/F which is provided by the service.

(9) Provision Method

This indicates a provision method of service I/F.

0: Request/Response, 1: Publish/Subscribe

(10) Number of Subscribe

This indicates the number (0-255) of services which execute "Subscribe" to service I/F of Publish/Subscribe.

When "0", "Subscribe service information" is not held.

(11) Number of Used Services

This indicates the number (0-255) of other services which the service uses.

When "0", "Information on used service" is not held.

(12) Assignment of Version of Used Service

This indicates an assignment method of "service version" of "information on used service".

Formal: [version assignment of I/F version (3 bits)] [version assignment of inner version (3 bits)]

0: Fixed version—using only the service having a value that the same as the value of the "service version" or "I/F version" of "service version" of "information on used service."

1: Assigned version or greater—using the services each having a value equal to or greater than the value of the "service version" or "I/F version" of "service version" of "information on used service."

2: Assigned version or less—using the services each having a value equal to or less than the value of the "service version" or "I/F version" of "service version" of "information on used service."

3: Latest version or less—using the service having a greatest value of the "service version" or "1/F version" of "service version" of "information on used service" among all the services with assigned service IDs, The value of "service version" of "information on used service" is supposed to be unfixed.

Suppose the case where the service version of "information on used service"=3.2, "version assignment of 1/F version"=fixed version, and "version assignment of inner version" assigned version or less. In this case, the service version serving as a target to be used is set to 3.2, 3.1, or 3.0.

Next, the following other service specifications (i.e., items of information on service), as in FIG. 6, may be also adopted. The meanings or details (1)-(15) thereof are as follows.

Alternative service: (1) Provided to safely travel or stop the vehicle even when the service is unusable.

Effect on vehicle control: (2) The presence or absence of an effect on traveling, curving, or stopping.—A service cannot be installed or updated during traveling when the service affects the vehicle control.—A service can be installed or updated during traveling when the service does not affect the vehicle control.

Priority to transmit or receive a service: (3) Used for priority control in mediation between several services.

Authority as an active or passive entity to link the priority to transmit or receive a service: (4) It is dangerous if a cooperative service to control braking can be easily generated, for example.

Place to install a service: (5) Restriction such as a physical distance to another service needed to accomplish the service.

Reliability: (6) Identification of a person who generated the service.

Service of other vehicles permitted to be linked: (7) A service of other vehicles that is permitted to link with the service.

Exterior service permitted to be linked: (8) A cloud or smartphone service that is permitted to link with the service.

Price: (9) Price of the service.

Recommendation: (10) A degree of recommendation about the service.

Delay requirement: (11) Communication delay time to accomplish the service.

Expiration date: (12) Including the presence or absence of automatic update.

Addition or removal unit: (13) Application, ECU, domain, or vehicle.

Security level: (14) Security level for the service.

Safety level: (15) Function safety level for the service.

<Development Language>

The description below concisely explains an application development language to provide the above-mentioned services.

1. Adapter (1) Service start (Start)

Service start (Start) starts a service.

(2) Service start completion (onStarted)

Service start completion (onStarted) is a handler used to complete the service start. Service start completion (onStarted) is invoked only once when the service start is completed after Service start (Start) is invoked.

(3) Service start state acquisition

Service start state acquisition (isStarted) acquires a state concerning whether the service start has been completed.

(4) Service information acquisition (getServiceInfo)

Service information acquisition (getServiceInfo) acquires service information. This method acquires the service information when a service starts.

(5) Service ID acquisition (getServiceId)

Service ID acquisition (getServiceId) acquires a service ID and returns the service ID based on information the service information acquisition (getServiceInfo) can acquire.

(6) Service version acquisition (getServiceVersion)

Service version acquisition (getServiceVersion) acquires a service version and returns the service version based on information the service information acquisition (getServiceInfo) can acquire.

(7) Service information protocol acquisition (getServiceProtocol)

Service information protocol acquisition (getServiceProtocol) acquires a protocol provided by the service.

(8) Intended service information acquisition (getRequireServiceInfo)

Intended service information acquisition (getRequireServiceInfo) acquires service information about a used service. When a service starts, this method acquires service information about the used service and performs a service start process.

(9) Transmission request (request)

Transmission request (request) transmits a request to a specified service and returns a request acceptance number when the request is accepted normally. A response reception handler (onResponseReceived) is invoked when a response to the request is received.

Parameters include a request-destination service ID, a request-destination service version, a request data length, request data, and a request priority.

Here, the request destination signifies a service provider side.

(10) Request transmission error (onRequestError)

Request transmission error (onRequestError) is a handler used when the request transmission fails. The request acceptance number (requestNumber) stores the request acceptance number issued by a return value from the transmission request (request).

A parameter includes a request acceptance number corresponding to the failed request.

(11) Request reception (onRequestReceived)

Request reception (onRequestReceived) is a handler used to receive a request. A response returned by this method is notified to response reception (onResponse) of a request-origin service.

Parameters include a request data length and request data.

(12) Response reception (onResponseReceived)

Response reception (onResponseReceived) is a handler used to receive a response to the request.

Parameters include a request-origin service ID, a request-origin service version, a request priority, a request acceptance number, and response data.

Here, the request origin signifies a service user side.

(13) Publish transmission (Publish)

Publish transmission (Publish) publishes data.

Parameters include length (published data length) and data (published data).

(14) Publish reception (onPublishReceived)

Publish reception (onPublishReceived) is a handler used to receive published data from a service the intended service information acquisition (getRequireServiceInfo) identifies as a target to be used.

Parameters include a publish-origin service ID, a publish-origin service version, a published data length, and published data.

Figure 7:
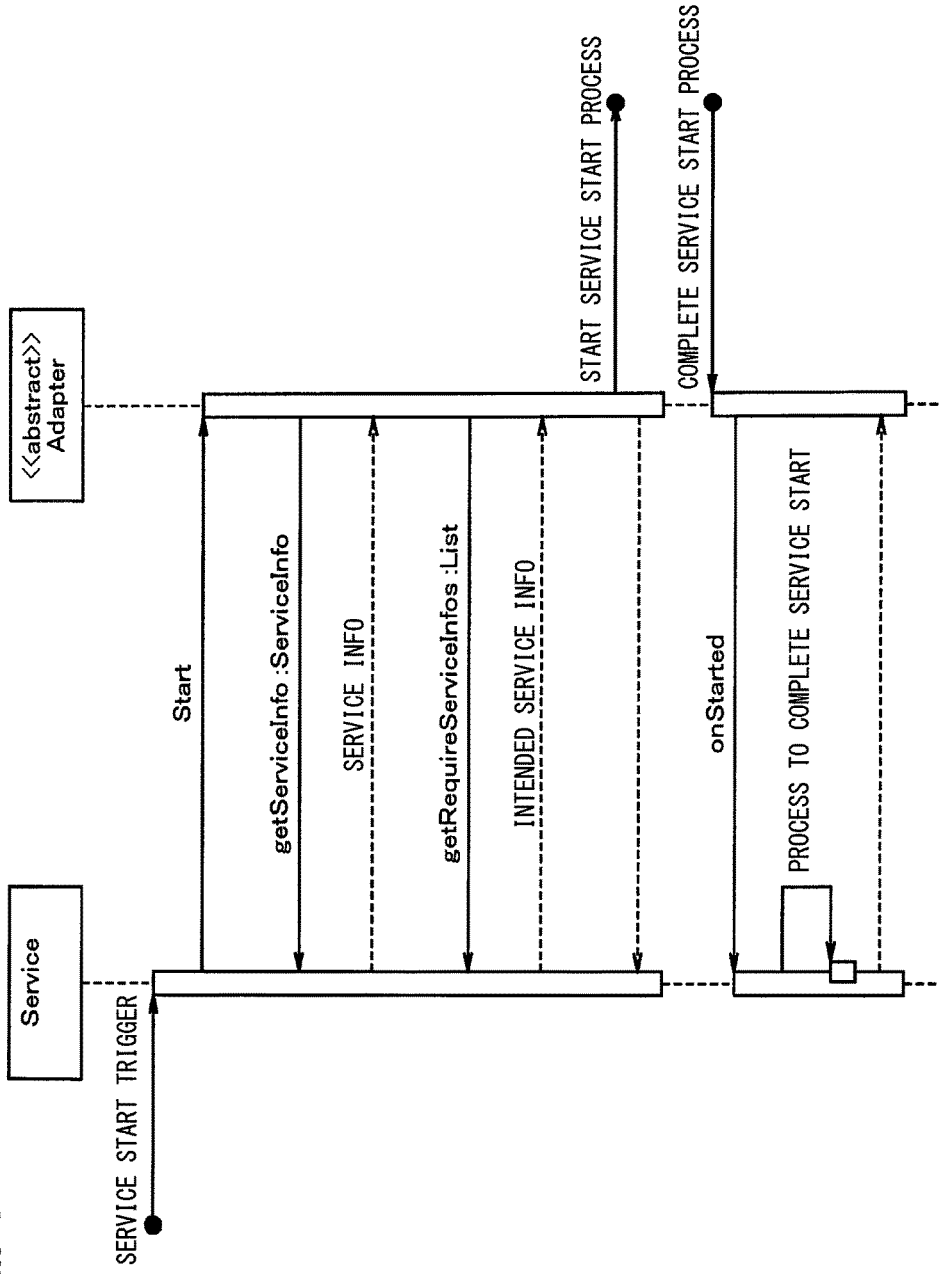
FIG. 7 is a diagram illustrating a process sequence to start a service.
Figure 8:
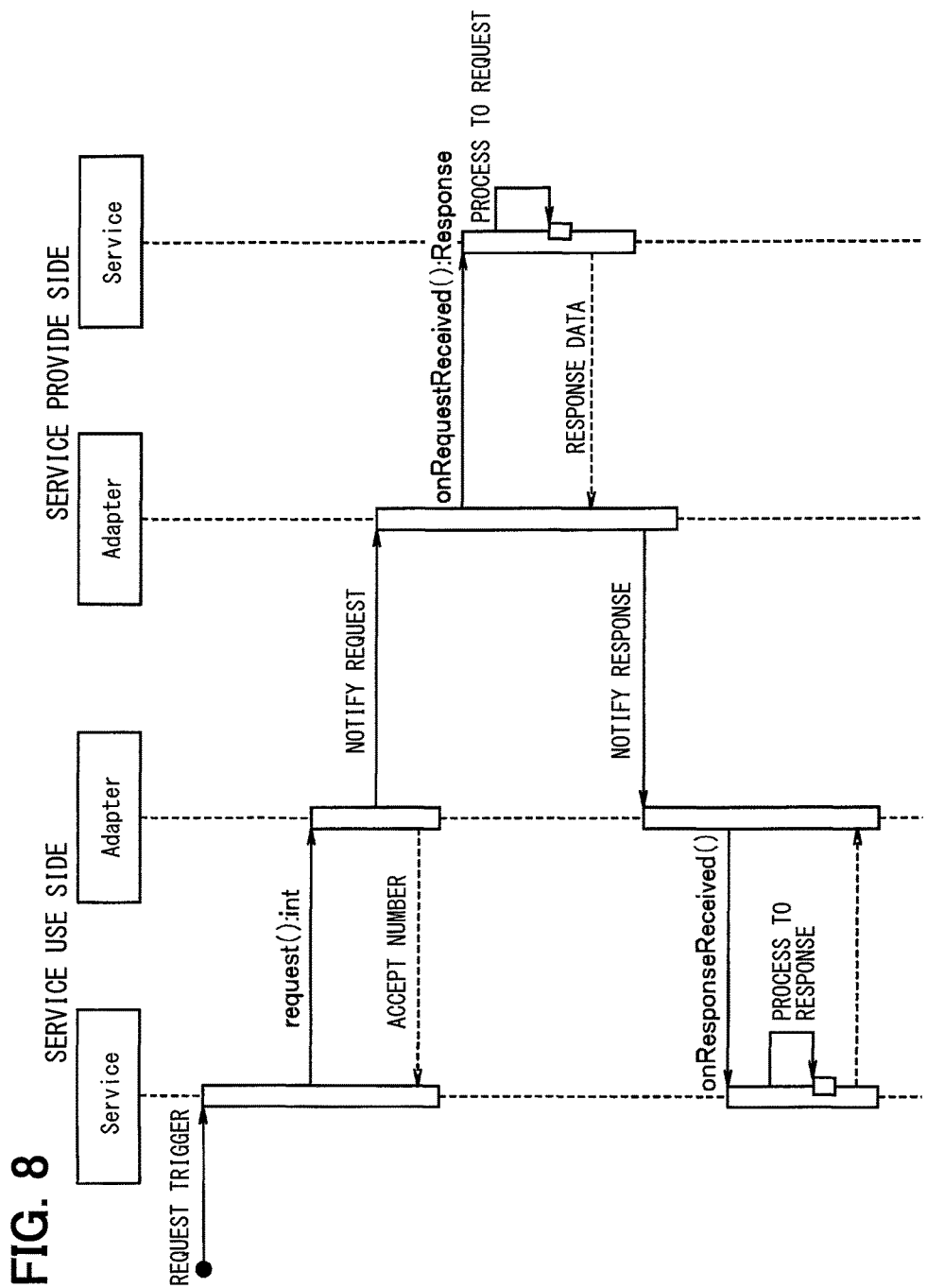
FIG. 8 is a diagram illustrating a process sequence during request transmission.
Figure 9:
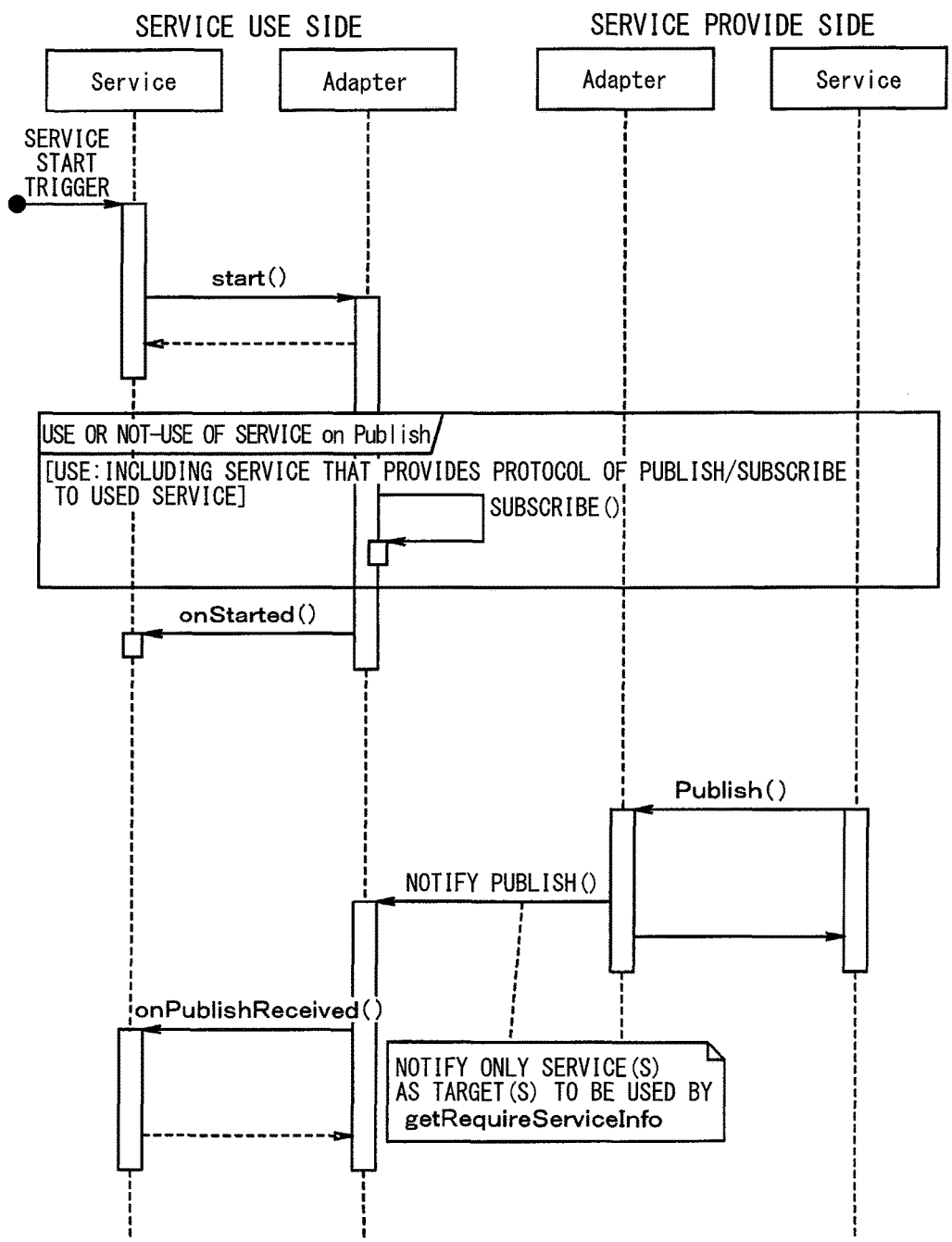
FIG. 9 is a diagram illustrating a process sequence during publication transmission.

The above-mentioned adapter 7 implements process sequences as follows. FIG. 7 illustrates a process sequence to start a service, FIG. 8 illustrates a process sequence to transmit a request. FIG. 9 illustrates a process sequence to transmit published data.

2. ServiceInfo (1) Constructor (ServiceInfo)

Constructor (ServiceInfo) generates service information from the service ID and the service version.

Parameters include a serve ID, a service version, and a protocol supplied by the service.

(2) Service ID acquisition (getId)

Service ID acquisition (getId) acquires a service ID.

(3) Service ID setup (setId)

Service ID setup (setId) sets a service ID.

A parameter includes a service ID.

(4) Service version acquisition (getVersion)

Service version acquisition (getVersion) acquires a service version.

(5) Service version setup (setversion)

Service version setup (setversion) sets a service version,

A parameter includes a service version.

(6) Supplied protocol acquisition (getProtocol)

Supplied protocol acquisition (getProtocol) acquires a supplied protocol.

(7) Supplied protocol setup (setProtocol)

Supplied protocol setup (setProtocol) sets a supplied protocol.

A parameter includes a protocol.

3. Response (1) Response generates a response by specifying response data on a one-byte basis.

Parameters include data1 (the first byte of response data) and data2 (the second byte of response data).

(2) Response byte data acquisition (getPayloadBytes)

Response byte data acquisition (getPayloadBytes) acquires response data on a byte-array basis.

(3) Response data acquisition (getPayload)

Response data acquisition (getPayload) acquires response data.

4. Protocol Enumeration

The description below explains a protocol enumeration, (1) None (no protocol supplied)

(2) PUBLISH_AND_SUBSCRIBE (publish/subscribe protocol supplied)

(3) REQUEST_AND_RESPONSE (request/response protocol supplied)

<Example of Integrated Application>

The description below explains an example of an integrated application that integrates or coordinates a plurality of services. As in FIG. 1, the engine ECU 3 is installed with the information provision service including the fuel consumption provision service, the engine temperature provision service, the engine coolant temperature provision service, and the engine oil temperature provision service. Thouse services use the PUBLISH_AND_SUBSCRIBE protocol. The accelerator control service uses the REQUEST_AND_RESPONSE protocol. The brake control service installed on the brake ECU 4 uses the REQUEST_AND_RESPONSE protocol. The vehicle speed provision service installed on the meter ECU 5 uses PUBLISH_AND_SUBSCRIBE as a communication protocol.

Figure 10A:
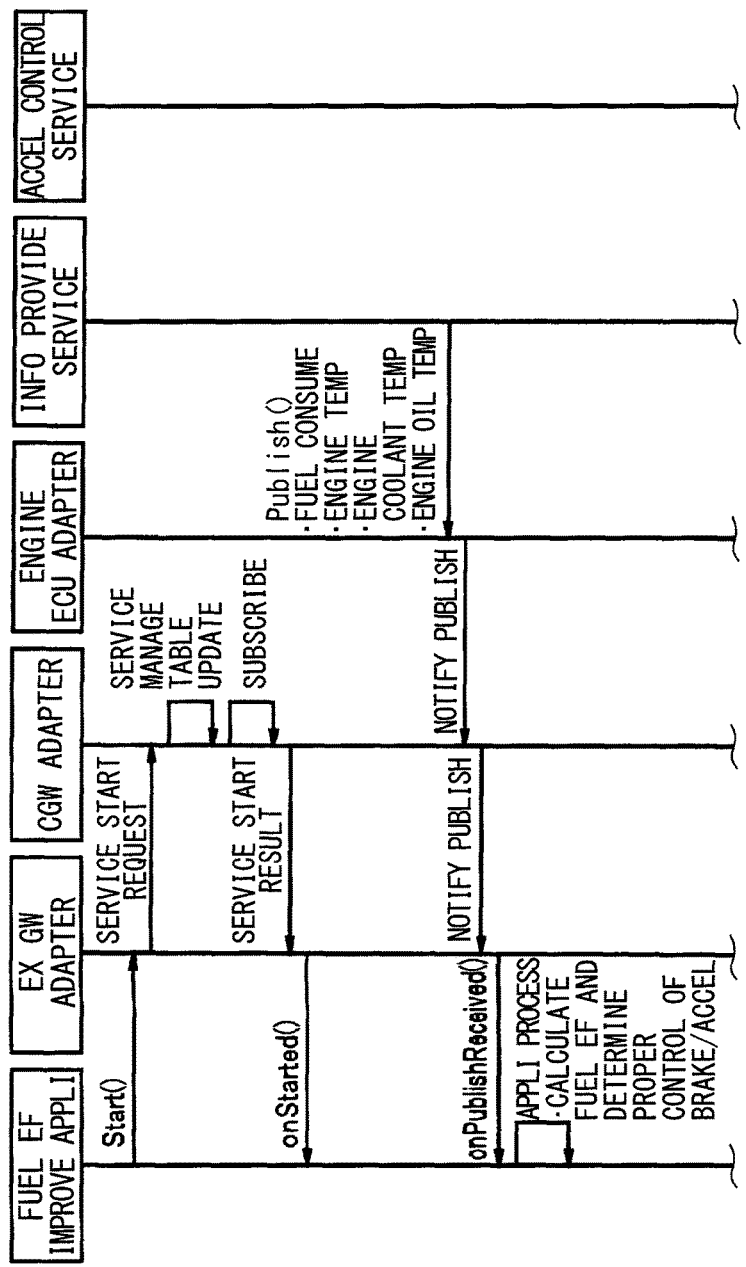
FIGS. 10A, 10B, and 10C are diagrams illustrating operations of an integrated application.
Figure 10B:
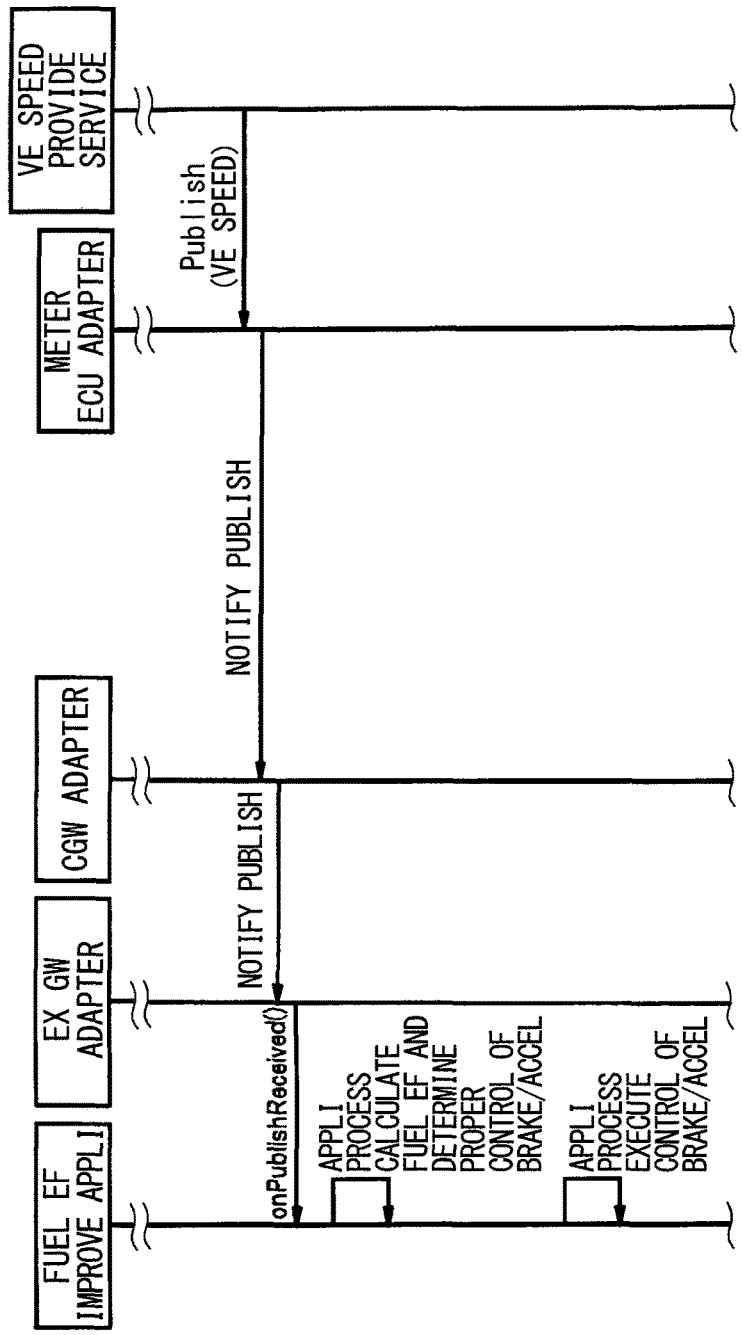
Figure 10C:
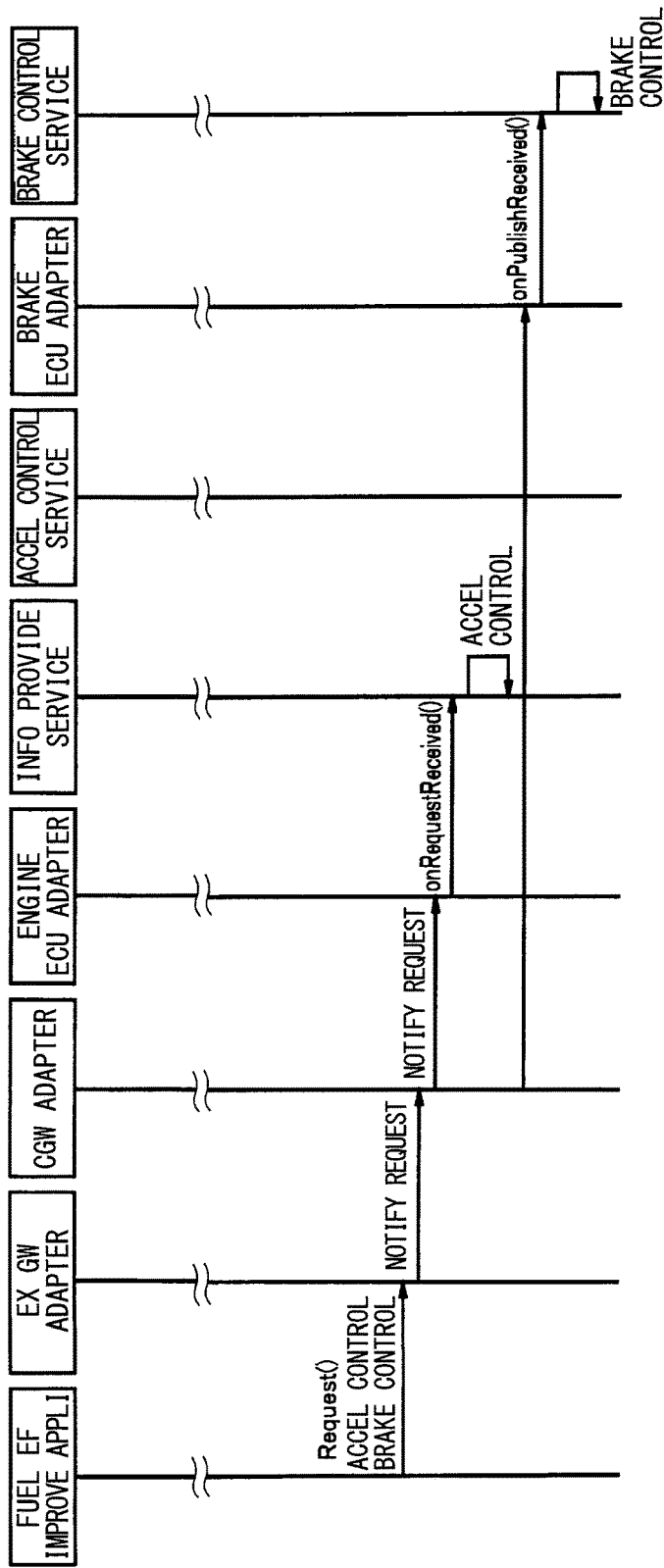

As in FIGS. 10A, 10B, and 10C, the description below describes operations of the integrated application by using services and adaptors of the extended GW 1, the central GW 2, the engine ECU3, the brake ECU 4, and the meter ECU 5. The extended GW 1 is installed with the fuel efficiency improvement application. The fuel efficiency improvement application improves the fuel efficiency by allowing the services to cooperate with each other. Namely, the fuel efficiency improvement application uses the vehicle speed provision service of the meter ECU 5 and various information provision services of the engine ECU 3 to acquire information needed for the fuel efficiency measurement, measure the fuel efficiency based on the acquired information, and determine whether the fuel efficiency can be improved. When determining that the fuel efficiency can be improved, the fuel efficiency improvement application uses the accelerator control service of the engine ECU 3 and the brake control service of the brake ECU 4 to supplementarily control the accelerator and the brake and thereby improve the fuel efficiency.

Displaying fuel efficiency information on a display unit requires addition of a display ECU, a display ECU adaptor, and a display service. The use of vehicle exterior infrastructure information such as a traffic light requires addition of an infrastructure and an infrastructure information provision service. In this case, the service I/F 8 previously transforms a function into a service so as to be able to dynamically generate an integrated application and coordinate a plurality of services.

<Modified Example of Integrated Application>

There is a case needing suitable updates of software programs of applications or integrated applications depending on change in IT (Information Technology), for instance. In such a case, static software rewriting or update cannot respond to a requirement that a user wants to use updated application any time driving or using the vehicle. In addition, there is another case that a vehicle exterior service having high real time requirement is supposed to be coordinated. The above cases require a system that can perform a dynamic software update.

Suppose a case to rewrite a software program in developing an integrated application that is assumed to appear in near future such as a highly-advanced driving assistance. Performing a static software rewriting onto a vehicle possessed by a user on a case-by-case basis, which needs a significant man power, is unrealistic. For example, adding a new ECU to an in-vehicle network after a vehicle is shipped from a manufacturing factory needs to statically rewrite a software in an existing ECU in order to transmit and receive a control signal between the new ECU and the existing ECU, or to statically rewrite a routing table in order that the central GW 2 relays (i.e., routes) a new control signal.

The following explains a case that generates an integrated application as an example of dynamically updating a software program. This integrated application performs determining a running environment based on the information such as time, weather, vehicle speed, inter-vehicle distance, recharge amount (for hybrid vehicles or electric vehicles); booming sounds at necessary time points; and calling the driver's attention. For this case, a conventional configuration to statically rewrite a software program needs to update software programs of the existing ECUs or central ECU 2 in order to execute a new operation based on a new control signal transmitted from the added new application (new addition service on the extended GW 1).

Figure 11:
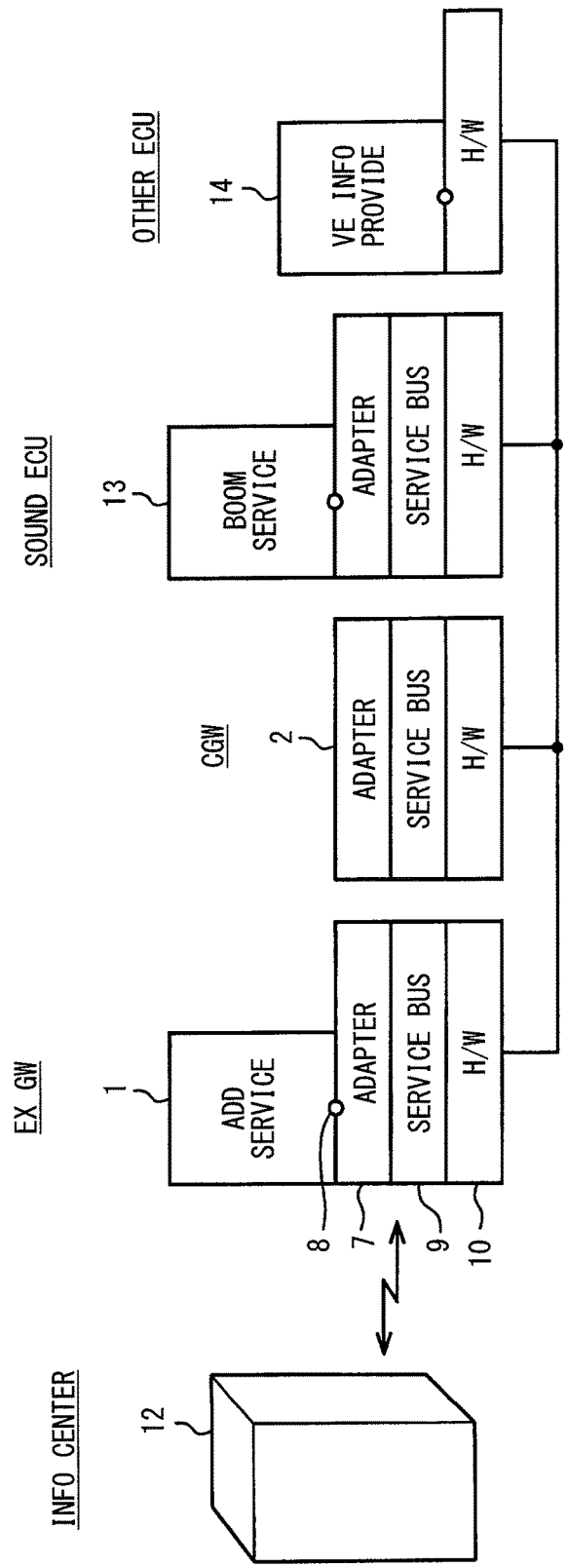
FIG. 11 is a block diagram illustrating a modified example of a vehicular service management system.
Figure 12A:
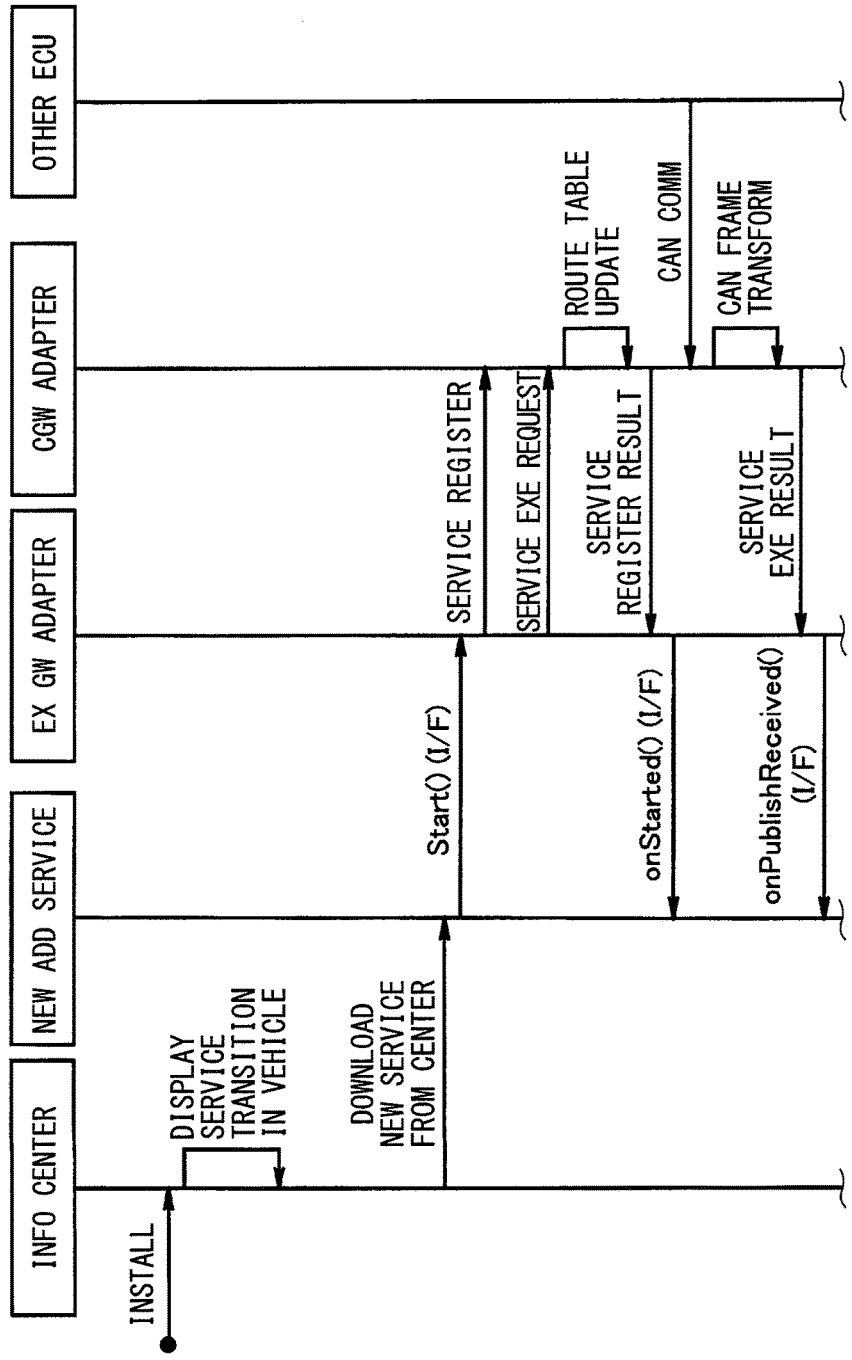
FIGS. 12A and 12B are diagrams illustrating operations of an integrated application according to the modified example.
Figure 12B:
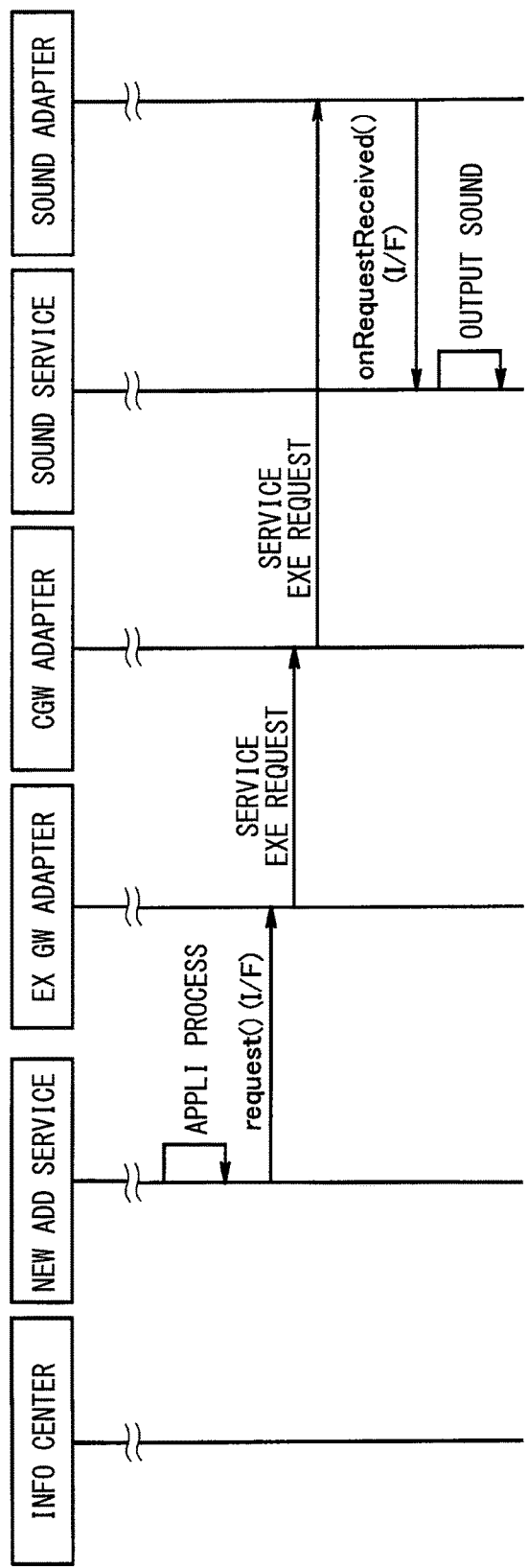

In contrast, according to the modified example illustrated in FIG. 11, the extended GW1 is provided to be able to communicate with an information center 12. The information center 12 monitors a service transition state of the vehicle, as illustrated in FIG. 12A, and downloads a new application (new service) into the extended GW 1 when needed.

When the extended GW 1 installs the new service, the extended GW adapter requests a service registration to the central GW adapter; the central GW adapter thereby updates the routing table. That is, the routing is updated by registering an ECU, which is needed for executing the service, into the routing table.

The central GW adapter collects the information from another ECU 14. When receiving a request to execute a service, which collects the information, from the extended GW adapter, the central GW adapter notifies the new addition service of the various information collected from the other ECU 14. The new addition service executes a predetermined application process to thereby issue a request for sound booming to the sound booming ECU adapter. The extended GW adapter issues a request for the execution of the service of sound booming to the sound booming ECU adapter in the sound booming ECU 13.

When receiving the request for the service execution from the new addition service, the sound booming ECU adapter transmits a response reception to the sound booming service; the sound booming service thereby outputs or booms the corresponding sounds. This procedure generates an integrated application that calls the driver's attention by coordinating the services without performing software rewriting.

Further, there may be issued a request to install an integrated application executing an operation similar to the above-mentioned fuel efficiency improvement application into a vehicle after having been shipped from a manufacturing factory. In the above, a new application (new addition service) is added to the extended GW 1, and is used in coordination with the information provision services (such as fuel consumption, engine temperature, vehicle speed) and the control services (such as accelerator, brake), which are exhibited previously by each ECU. This allows an integrated application which aims at the fuel efficiency improvement to be dynamically generated. The integrated application measures a fuel efficiency based on the information acquired from each ECU or the in-vehicle sensors, determines whether there is any room for the fuel efficiency improvement, and controls the brake and/or accelerator based on the result from the determination.

Further, another configuration may be provided such that the function of the extended GW 1 be integrated into the central GW 2. Adopting such configuration can decrease the cost and the weight of the vehicle, and decrease the global communication traffic of the in-vehicle network.

<Effects>

The above-mentioned embodiment can provide the following effects. The service I/F 8 is provided so as to connect a function of an application as a service to the service bus 9; thus the service can use another service via the service I/F 8. Further, the service manager 11 manages the position of each service to thereby dynamically and interoperably use the services. This allows the functions of the ECUs 3 to 5 to be dynamically and interoperably used. An application developer can thereby develop an application without needing to be aware of the existence of a layer lower than the topmost application layer.

The service manager 11 achieves dynamical addition and removal of the service by managing addition and removal of the service. This allows the functions of the ECUs 3 to 5 to be dynamically added or removed. The central GW 2 including the function of the service manager 11 allows the dynamic management of the vehicle interior/exterior services. An application developer can thereby develop an application without needing to be aware of position and addition and removal of an application to be used.

Without a developers considering the coordination of the services, an integrated application can be generated only by the added new addition service issuing a request to an existing service. That is, an integrated application can be dynamically developed inexpensively and quickly by coordinating a plurality of vehicle interior/exterior services, improving the development efficiency and providing a continuously progressed vehicle.

An integrated application can be generated dynamically by coordinating the existing services and the installed new application; the users can follow the development of the vehicle exterior services including IT while improving the value of the vehicle continuously.

The extended GW 1 and the central GW 2 are provided independently and the functions of both the GWs are separate from each other; the security level is improved and the in-vehicle control function is hidden from the integrated application.

Although the present disclosure is described based on the embodiment, it is understood that the present disclosure does not need to be limited to the embodiment or its configuration. The present disclosure also includes various modification examples and modifications within a scope of an equivalent. In addition, various combinations or embodiments, and other combinations or embodiments which contain only a single element, more than one element, or less than it may be included within a scope or concept of the present disclosure.

Other Embodiments

The present invention is not limited to the above-mentioned embodiment but may be modified or enhanced as follows. The above embodiment provides a configuration where the service manager 11 is installed in the central GW 2; however, the service manager 11 may be differently provided, e.g., to be installed in all of the extended GW 1 and the ECUs 3 to 5, or in any one of the extended GW 1 and the ECUs 3 to 5.

That is, any one of the ECUs may include the function of the service manager included in the central GW 2. Alternatively, several GWs or ECUs may share the function. Program development languages may include Java (registered trademark), C, C++, and Ruby. The various services to be provided in the future may be coordinated.

What is claimed is:

1. A vehicular ECU (electronic control unit) that is any one of a plurality of vehicular ECUs connected to an in-vehicle network in a vehicle, the vehicular ECU performing a predetermined function by using an application that is installed, the vehicular ECU coordinating with a different vehicular ECU among the plurality of vehicular ECUs excluding the vehicular ECU, the vehicular ECU comprising:

a service interface that issues a request of service that uses a function installed in the different vehicular ECU based on a request from the application, and makes the application generate a service as a response to a request of service from the different vehicular ECU;

a service bus that transmits and receives a message correspondingly to a request of service and a response by using a predetermined protocol between the service interface of the vehicular ECU and the service interface of the different vehicular ECU; and a service manager that achieves the service to be used dynamically and interoperably by managing a position of the service.

2. The vehicular ECU according to claim 1, wherein
the service manager achieves dynamic addition and removal of the service by managing addition and removal of the service.

3. The vehicular ECU according to claim 1, wherein
a predetermined application installed in the vehicular ECU generates an integrated application by coordinating with the service of the different vehicular ECU.

4. The vehicular ECU according to claim 1, wherein
the service bus uses a protocol to communicate via the in-vehicle network, the protocol being available as: a Request/Response type that performs one-to-one message by exchanging messages of request and response; and a Publish/Subscribe type that performs one-to-many messages by publishing a message to many and unspecified registered subscribers.

5. A vehicular service management system comprising:

a plurality of vehicular ECUs (electronic control units) that are connected to an in-vehicle network in a vehicle, each of the vehicular ECUs performing a predetermined function by using an application; and a gateway that is connected to the in-vehicle network and routes information between the vehicular ECUs, wherein a subject vehicular ECU being any one of the vehicular ECUs cooperates with a different vehicular ECU among the vehicular ECUs excluding the subject vehicular ECU, the subject vehicular ECU includes:

a service interface that issues a request of service that uses a function installed in the different vehicular ECU based on a request from the application, and makes the application generate a service as a response to a request of service from the different vehicular ECU; and a service bus that transmits and receives a message correspondingly to a request of service and a response by using a predetermined protocol between the service interface of the subject vehicular ECU and the service interface of the different vehicular ECU, wherein the gateway includes a service manager that achieves the service to be dynamically and interoperably used by managing a position of the service.

6. The vehicular service management system according to claim 5, wherein the service manager achieves dynamical addition and removal of the service by managing addition and removal of the service.

7. The vehicular service management system according to claim 5, further comprising:

an extended gateway that is connected to the in-vehicle network and uses a service in an exterior outside the vehicle.

8. The vehicular service management system according to claim 7, wherein:

the extended gateway is able to install a new application from the exterior outside the vehicle; and the new application installed in the extended gateway generates an integrated application by coordinating services of the vehicular ECUs and the service in the exterior outside the vehicle.

9. The vehicular service management system according to claim 5, wherein the service bus uses a protocol to communicate via the in-vehicle network, the protocol being available as: a Request/Response type that performs one-to-one message by exchanging messages of request and response; and a Publish/Subscribe type that performs one-to-many messages by publishing a message to many and unspecified registered subscribers.

10. The vehicular ECU according to claim 1, further comprising:

a storage storing previously items of information on service, the stored items of information on service being used by the service manager to achieve the service to be used dynamically to be executable under an operating state of the vehicular ECU without need of re-starting and interoperably by managing the position of the service.

11. The vehicular service management system according to 5, further comprising:

a storage storing previously items of information on service, the stored items of information on service being used by the service manager to achieve the service to be used dynamically to be executable under an operating state of one of the vehicular ECUs without need of re-starting and interoperably by managing the position of the service.

* * * * *